United States Patent [19]  [11] 4,433,106
Musch et al.  [45] Feb. 21, 1984

[54] PRODUCTION OF SULPHUR-MODIFIED POLYCHLOROPRENE RUBBERS

[75] Inventors: Rüdiger Musch, Bergisch-Gladbach; Wolfgang Konter, Neuss; Wilhelm Göbel, Leverkusen, all of Fed. Rep. of Germany

[73] Assignee: Bayer Aktiengesellschaft, Leverkusen, Fed. Rep. of Germany

[21] Appl. No.: 436,198

[22] Filed: Oct. 25, 1982

[30] Foreign Application Priority Data

Nov. 3, 1981 [DE] Fed. Rep. of Germany ....... 3143525

[51] Int. Cl.$^3$ .................. C08L 11/00; C08L 27/22
[52] U.S. Cl. .................... 525/215; 525/330.8; 525/331.3; 525/348; 525/352

[58] Field of Search .............. 525/215, 330.8, 348, 525/352

[56] References Cited

U.S. PATENT DOCUMENTS 3,079,359  2/1963  Stierli .................. 525/215
4,209,596  6/1980  Hashimoto et al. ......... 525/215

*Primary Examiner*—J. Ziegler
*Attorney, Agent, or Firm*—Connolly and Hutz

[57] ABSTRACT

Vulcanizable, elastomeric, sulphur-modified polychloroprene rubbers having improved properties are obtained by adding up to 40%, by weight, of SBR latex (solids, based on total solids) before working-up and before or after peptization.

5 Claims, No Drawings

PRODUCTION OF SULPHUR-MODIFIED POLYCHLOROPRENE RUBBERS

This invention relates to a process for the production of vulcanizable, elastomeric, sulphur-modified polychloroprene rubbers having improved properties.

Sulphur-modified polychloroprene rubber has many valuable properties and, because of this, has been adopted for use on a wide scale. In this connection, adequate masticatability and vulcanizability without the addition of thiourea accelerators must be regarded as particularly advantageous. In addition, articles such as V-belts and pneumatic bellows, are preferably made from these particular polymers on account of the high dynamic loads to which they are subjected. These raw material and vulcanizate properties may be optimized as required by the addition of other polymers.

Depending on the particular field of application, some product properties of the sulphur-modified polychloroprene rubber may be improved by blending with other rubbers, while other properties, undesirable for the particular application envisaged, may be suppressed.

Such mixtures of sulphur-modified polychloroprene rubbers with other rubbers or thermoplasts have been known for some time and are produced in many variations by mixing the solid components, for example on mixing rolls or in internal mixers. Production methods and applications are described in the specialist literature (Rubber Chem. Techn. 47, 481–550 (1974) and 49, 93–104 (1976)).

However, such a mixing procedure in solid form on mixing rolls is also attended by disadvantages. Thus, there is initially a reduction in viscosity, followed rapidly by an undesirable, premature increase with extremely adverse effects upon scorch resistance.

An object of the present invention is to obviate these disadvantages.

It has now surprisingly been found that a sulphur-modified polychloroprene rubber having improved thermal stability and improved processibility may be obtained by mixing from 0.5 to 40%, by weight, of SBR latex (solids, based on total solids) with the sulphur-modified polychloroprene latex before working-up by coagulation, filtration and drying and before or after peptisation.

The thus-obtained polymer mixtures show higher stability under thermal load, such as occurs, for example, during drying of the moist polymer, and accordingly may be processed without difficulty.

The mixtures show minimal tackiness on mixing rolls and also rapid rough-sheet formation (higher "tel-tack" and lower "true tack"), effects which do not occur when the components are only mixed on mixing rolls.

"Tel tack" is to be understood to be the cohesive force measured between two test specimens of the polymer mixture according to the present invention.

"True tack" is to be understood to be the adhesive force exerted by a test specimen of the polymer mixture on a metal plate, for example of roll steel.

Depending on the viscosity of the SBR-latex added, it is possible specifically to produce rubber mixtures having different, advantageous properties.

Accordingly, the present invention relates to a process for the production of S-modified polychloroprene rubbers from peptised polychloroprene latices which is characterised in that up to 40%, by weight, of SBR-latex (solids, based on total solids) is mixed with the polychloroprene latex before working-up by coagulation, filtration and drying in the conventional way and before or after peptization.

The polychloroprene latex preferably used is a mixture of two or more sulphur-modified polychloroprene latices differing in the sulphur content thereof, the average sulphur content of the mixture corresponding to the required value. If this mixture is worked-up together with SBR-latex to form the solid rubber after peptisation, polymers characterized, for example, by excellent dynamic properties of the vulcanizates are obtrained.

It is possible in this way, irrespective of the particular mixing conditions, to obtain rubber having a defined, uniform composition and excellent product properties which could not be obtained by subsequently mixing the solid, dried polymers.

If the polychloroprene rubbers differing in sulphur content and the SBR-rubber are mixed in solid form on mixing rolls, mixing is generally accompanied in its initial stages by a reduction in viscosity which is rapidly followed, on account of the long mixing time required to incorporate the additives, by an undesirable premature increase in the viscosity of the mixture with extremely adverse effects upon scorch resistance.

The rubber mixture prepared in accordance with the present invention preferably consists of from 92 to 99%, by weight, of polychloroprene rubber and from 8 to 1%, by weight, of SBR rubber (based in each case on solids).

The viscosity of and the percentage in the polymer mixture of the SBR-copolymer, which may even contain gel, will depend upon the required property spectrum of the rubber and may readily be determined by those skilled in the art. Generally the polychloroprene latex consists of a sulphur-modified polychloroprene latex having a sulphur content of from 0.3 to 0.7%, by weight, preferably from 0.35 to 0.4%, by weight, based on chloroprene, or of a mixture of from 60 to 90%, by weight, of such a polychloroprene latex with from 40 to 10%, by weight, of a sulphur-modified polychloroprene latex containing from 0.8 to 1.5%, by weight, of sulphur, based on chloroprene. The production of such latices is known from DE-OS Nos. 1,807,298 of June 4, 1970 and 2,755,074 of June 15, 1978.

Styrene-butadiene latices produced by emulsion polymerization and having a styrene content of from 5 to 50%, by weight, preferably from 20 to 30%, by weight, are particularly suitable for use as the SBR-latices. In the form of solid rubber, low-viscosity SBR-latex has a Mooney viscosity (ML-4) of from 20 to 40 Mooney units, while highly viscous SBR-latex has a Mooney viscosity (ML-4) of from 40 to 150 Mooney units.

EXAMPLE 1

Production of the polychloroprene latex 970 g of chloroprene and 30 g of 2,3-dichlorobutadiene are emulsified in 1500 g of deionized water containing 55 g of disproportionated resinic acid (solids content 70%), 5 g of the sodium salt of a naphthalene sulphonic acid/formaldehyde condensation product, 5 g of sodium hydroxide, 5 g of anhydrous sodium pyrophosphate, 5 g of triisopropanolamine and 12 g of a 50% sulphur dispersion.

The emulsion is purged with nitrogen, heated to 50° C. and the polymerization reaction initiated by the addition of a catalyst solution of 10 g of potassium persulphate and 0.2 g of sodium β-anthraquinone sulphonate in 490 g of water. During the polymerization reaction, more catalyst solution is introduced at such a rate that the temperature of the mixture does not exceed 50° C. After a monomer conversion of 65%, the reaction is stopped by the addition of 1 g of phenothiazine and the excess monomer is separated off by steam distillation under reduced pressure. A latex $A_1$ having a solids content of 26.5%, by weight, is obtained.

EXAMPLE 2

(Comparison Example 40 kg of latex $A_1$ are peptised to a Mooney viscosity ML-4 of 59 Mooney units in accordance with DE-OS No. 1,807,298, a solid rubber having a Mooney viscosity ML-4 of 40 Mooney units (see Table, Example 2) is obtained after working-up.

EXAMPLE 3

(Production Comparison)

8.0 tonnes of latex $A_1$ are mixed with 0.28 tonne of a low-viscosity SBR latex having a solids content of 23%, by weight, a styrene content of 5%, by weight and a Mooney viscosity of the solid rubber (ML-4) of 25 Mooney units (latex $B_2$) and the resulting latex mixture is peptised and coagulated in the same way as in Example 2. 2.2 tonnes of the solid rubber having a Mooney viscosity ML-4 of 34 Mooney units is obtained after drying. Working-up takes place without problems.

EXAMPLE 4

(Comparison with Example 3)

7.0 tonnes of latex $A_1$ are peptized in the same way as described in Example 3 and worked-up in accordance with Example 3, but without the addition of SBR-latex. Drying of the coagulated, moist polymer had to be stopped after 0.9 tonnes because the polymer was sticking to the drying belt of the industrial dryer and could no longer be lifted off. The Mooney viscosity value ML-4 amounted to 45 Mooney units.

EXAMPLES 5 TO 7

(Viscosity stability)

Latex $A_1$ is mixed with different quantities of highly viscous latex B and the resulting mixtures worked-up in the same way as described in Example 2. Example 2 is a Comparison Example. The SBR latex has a solids content of 24%, a styrene content in the solids of 23.5% and a Mooney viscosity ML-4 of 15 Mooney units (latex $B_2$).

| Sample from Example No. | Mixing ratio latex $A_1$ (solid) | Mixing ratio SBR-latex (solid) | ML-4 (MU) | ML-4 after 24 hours/ 70° C. (MU) | ML (MU) |
|---|---|---|---|---|---|
| 2 | 100 | 0 | 40 | 28 | −12 |
| 5 | 85 | 15 | 42 | 38 | −4 |
| 6 | 75 | 25 | 42 | 41 | −1 |
| 7 | 60 | 40 | 43 | 43 | ±0 |

EXAMPLE 8

(Rubber for Examples 10 and 11)

A latex mixture consisting of 85 parts (solid) of latex $A_1$ and 15 parts (solid) of SBR-latex is peptised to a Mooney viscosity ML-4 of 67 Mooney units and worked-up in the same way as in Example 2. Thereafter, the Mooney viscosity ML-4 amounts to 43 Mooney units.

EXAMPLE 9

(Comparison with Example 8)

Latex $A_1$ is peptised to a Mooney viscosity ML-4 of 70 Mooney units and worked-up in accordance with Example 2. The rubber has a Mooney viscosity ML-4 of 45 Mooney units.

EXAMPLE 10

(Rough-sheet formation)

Mixing rolls 200 mm in diameter and having a working width of 390 mm with a fraction ratio of 1:1.113 were used. With the slower roll turning at a speed of 15 $min^{-1}$, the rubber passes through the mixing rolls adjusted to a gap width of 0.3 mm. Tackiness is assessed at the same time. Excess quantities of talcum have to be removed beforehand. With the slower roll turning at a speed of 7 $min^{-1}$ for a gap width between the rolls of 3 mm, rough sheet formation is observed. The starting temperature of the mixing rolls should be from 35° to 40° C. 1500 g of rubber are applied to the rolls and the time required for formation of the rough sheet is measured.

The operation as a whole is assessed on the basis of 3 numbers:

1st number: time in minutes required to form continuous sheet;
2nd number: assessment of tackiness;
    1=sheet does not stick (is not entrained by the faster roll)
    2=sheet sticks slightly (is entrained to some extent by the faster roll)
    3=sheet sticks moderately (has to be gently lifted)
    4=sheet sticks firmly (may only be lifted with effort)
3rd number: surface quality;
    1=smooth
    2=slightly split
    3=moderately split
    4=seriously split

| Polymer according to Example No. | Rough sheet formation |
|---|---|
| 8 | 1.5-2-1 |
| 9 | 3.0-4-3 |

EXAMPLE 11

(Roll tackiness)

For the purpose of characterizing the rubbers on a semi-technical level, the following substances are initially mixed for 4 minutes in a laboratory kneader:

| Rubber | 100 parts, by weight |
| Carbon black | 30 parts, by weight |
| Aromatic mineral oil | 15 parts, by weight |
| Phenyl-α-naphthylamine | 1 part, by weight |

| | -continued | |
|---|---|---|
| Stearic acid | 0.5 | part, by weight |
| Magnesium oxide | 4 | parts, by weight |
| Zinc oxide | 5 | parts, by weight |

After storage for about 24 hours at room temperature. The mixture is preheated to from 50° to 55° C. on mixing rolls and then drawn out on a 3-roll laboratory calender (roll length 400 mm; roll diameter 200 mm) with friction ratios of 1:1.31 between the first and second rolls and 1:1 between the second and third rolls, to form a 0.5 mm thick band.

| Setting | Temperature of the rolls (°C.) | | | Polymer of Example 8 | Polymer of Example 9 |
|---|---|---|---|---|---|
| | 1 | 2 | 3 | | |
| A | 35 | 40 | 50 | 1[1] | 3[1] |
| B | 40 | 45 | 55 | 2 | 4 |
| C | 43 | 52 | 60 | 2-3 | —[2] |

[1] for evaluation, see Example 10
[2] cannot be measured

EXAMPLE 12

(Vulcanization behaviour)

A carbon black mixture prepared in accordance with ISO 2475 is tested for its vulcanization behaviour at 150°

| Rubber of Example No. | 2 | 5 | 6 | 7 |
|---|---|---|---|---|
| Reaction time ($t_{90}-t_{10}$) mins | 19.2 | 13.5 | 12.4 | 10.8 |

EXAMPLES 13 TO 15

(Dynamic behaviour)

A rubber latex $A_2$ is prepared in accordance with Example 1 in the presence of 0.8 g of 50% sulphur dispersions and peptized by the addition of 1.0 g of tetramethyl thiuram disulphide and 0.85 g of dibutyl dithiocarbamate before the residual monomer is removed. Working-up is carried out in accordance with Example 2. Some more of latex $A_2$ is mixed with SBR-latex having a solids content of 24%, by weight, a styrene content of 23.5%, by weight, and a Mooney viscosity ML-4 of 50 Mooney units (solid rubber) in a ratio, by weight, (solid-on-solid) of 85:15 and 70:30.

The products are vulcanized in the same way as in Example 12 and crack formation is determined in accordance with De Mattia after ageing for 7 days at 100° C.

The long-term bending test using a De Mattia machine is carried out in accordance with DIN 53 522. The number of kilocycles up to crack formation are evaluated for the stages quoted in the Standard. In the present case, the kilocycles of all stages are then averaged. Example 13 is a Comparison Example.

| Polymer of Example No. | Mixture $A_2$:SBR | Mooney viscosity (MU) | Elongation (%) | Modulus (300% elongation) (MPa) | Crack determination (kilocycles) |
|---|---|---|---|---|---|
| 13 | 100:0 | 40 | 580 | 10.1 | 157 |
| 14 | 85:15 | 42 | 530 | 9.9 | 244 |
| 15 | 70:30 | 44 | 595 | 9.3 | 285 |

EXAMPLES 16 TO 20

Latex A is prepared in the presence of different sulphur contents in the latex, mixed together with SBR-latex according to Examples 13 to 15 and the mixture is worked-up in accordance with Example 2.

Vulcanisation and De Mattia testing are carried out in the same way as in Examples 13 to 15.

| Example No. | Percentages, by weight, in the mixture Latex A: sulphur content in the mixture | | | | | Modulus (300% elongation) (MPa) | Vulcanizate data crack determination (kilocycles) |
|---|---|---|---|---|---|---|---|
| | 0.6 | 0.8 | 1.0 | 1.2 | SBR-latex | | |
| 16 | 100 | 0 | 0 | 0 | 0 | 6.6 | 102 |
| 17 | 64 | 0 | 0 | 0 | 36 | 5.8 | 265 |
| 18 | 44 | 20 | 0 | 0 | 36 | 5.8 | 480 |
| 19 | 44 | 0 | 20 | 0 | 36 | 6.0 | 472 |
| 20 | 44 | 0 | 0 | 20 | 36 | 5.9 | 476 |

We claim:
1. A process for the production of sulphur-modified polychloroprene rubber comprising mixing 0.5 to 40% by weight of styrene-butadiene-rubber latex solids, based on total solids, with a polychloroprene latex containing from 0.3 to 0.7% by weight of sulphur based on chloroprene, followed by peptization, coagulation, filtration and drying.
2. The process of claim 1, wherein
from 92 to 99%, by weight, of polychloroprene rubber are mixed with from 8 to 1%, by weight, of styrene-butadiene-rubber (solids in each case).
3. The process of claim 1, wherein
the sulphur-modified polychloroprene latex consists of from 60 to 90%, by weight, of a polychloroprene latex containing from 0.3 to 0.7%, by weight, of sulphur, based on chloroprene, and from 40 to 10%, by weight, of a sulphur-modified polychloroprene latex containing from 0.8 to 1.5%, by weight, of sulphur, based on chloroprene.
4. The process of claim 1, wherein
the styrene-butadiene-rubber-latex has a styrene content of from 5 to 50%, by weight.
5. The process of claim 1, wherein
the styrene-butadiene-rubber-latex has a styrene content of from 20 to 30%, by weight.

* * * * *